(12) United States Patent
Bose et al.

(10) Patent No.: US 11,748,656 B1
(45) Date of Patent: Sep. 5, 2023

(54) DECISION TREE LEARNING WITH MISSING DATA

(71) Applicant: American Express Travel Related Services Company, Inc., New York, NY (US)

(72) Inventors: Sandeep Bose, Scottsdale, AZ (US); Ravneet Ghuman, Phoenix, AZ (US); Madhu Sudhan Reddy Gudur, Phoenix, AZ (US); Vinod Yadav, Scottsdale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 563 days.

(21) Appl. No.: 16/794,681

(22) Filed: Feb. 19, 2020

(51) Int. Cl.
*G06F 9/44* (2018.01)
*G06N 20/00* (2019.01)
*G06N 5/00* (2023.01)

(52) U.S. Cl.
CPC ............. *G06N 20/00* (2019.01); *G06N 5/003* (2013.01)

(58) Field of Classification Search
CPC ...................................................... G06N 20/00
USPC .......................................................... 706/12
See application file for complete search history.

(56) References Cited

U.S. PATENT DOCUMENTS

2019/0287023 A1* 9/2019 Kasahara ............ G06F 12/0607
2020/0012382 A1* 1/2020 Lee ....................... G06F 3/0418

* cited by examiner

*Primary Examiner* — Timothy A Mudrick
(74) *Attorney, Agent, or Firm* — Thomas | Horstemeyer, LLP

(57) ABSTRACT

Disclosed are various embodiments for using decision trees for machine-learning when data is missing from a data set. A first attribute for splitting a plurality of records is identified. Then, the plurality of records are split into a first subset of records and a second subset of records. The first subset of records can include each of the plurality of records where a value is present for the first attribute and the second subset of records comprising each of the plurality of records where the value is absent for the first attribute. Finally, a node can be added to a decision tree that reflects the split of the plurality of records into the first subset of records and the second subset of records.

20 Claims, 6 Drawing Sheets

| | Date | High Temp. | Humidity | Overcast? | Rain | Play Ball? |
|---|---|---|---|---|---|---|
| 103a | June 10 | 84 F | 75 % | | No | Y |
| 103b | June 11 | 77 F | 84 % | Full | | N |
| 103c | June 12 | 83 F | | Partial | No | Y |
| 103d | June 13 | 90 F | | No | No | Y |
| 103e | June 14 | 92 F | 57 % | No | | Y |
| 103f | June 15 | 84 F | 82 % | | | N |
| 103g | June 16 | 85 F | 66 % | Partial | Yes | Y |
| 103h | June 17 | 87 F | 58 % | Full | No | Y |
| 103i | June 18 | 74 F | 72 % | Full | Yes | N |
| 103j | June 19 | 75 F | 77 % | Partial | Yes | Y |
| 103k | June 20 | 75 F | 84% | Full | Yes | N |
| 103l | June 21 | 85 F | 63 % | No | No | Y |
| 103m | June 22 | | 58 % | No | No | Y |
| 103n | June 23 | | 55 % | No | No | Y |
| 103o | June 24 | | 67 % | No | No | Y |
| 103p | June 25 | | 94 % | Full | Yes | N |
| 103q | June 26 | | 98 % | Full | Yes | N |
| 103r | June 27 | 88 F | 97 % | Partial | Yes | Y |
| 103s | June 28 | 81 F | 93 % | | Yes | Y |
| 103t | June 29 | 77 F | 90 % | Full | Yes | N |
| 103u | June 30 | 95 F | 84 % | No | No | Y |
| 103v | July 1 | 97 F | 74 % | | No | N |
| 103w | July 2 | 99 F | 69 % | No | | N |
| 103x | July 3 | 100 F | | No | No | N |
| 103y | July 4 | 101 F | | No | No | N |
| 103z | July 5 | 98 F | | No | No | N |

|  | 106a | 106b | 106c | 106d | 106e | 106f |
|---|---|---|---|---|---|---|
|  | Date | High Temp. | Humidity | Overcast? | Rain | Play Ball? |
| 103a | June 10 | 84 F | 75 % |  | No | Y |
| 103b | June 11 | 77 F | 84 % | Full |  | N |
| 103c | June 12 | 83 F |  | Partial | No | Y |
| 103d | June 13 | 90 F |  | No | No | Y |
| 103e | June 14 | 92 F | 57 % | No |  | Y |
| 103f | June 15 | 84 F | 82 % |  |  | N |
| 103g | June 16 | 85 F | 66 % | Partial | Yes | Y |
| 103h | June 17 | 87 F | 58 % | Full | No | Y |
| 103i | June 18 | 74 F | 72 % | Full | Yes | N |
| 103j | June 19 | 75 F | 77 % | Partial | Yes | Y |
| 103k | June 20 | 75 F | 84% | Full | Yes | N |
| 103l | June 21 | 85 F | 63 % | No | No | Y |
| 103m | June 22 |  | 58 % | No | No | Y |
| 103n | June 23 |  | 55 % | No | No | Y |
| 103o | June 24 |  | 67 % | No | No | Y |
| 103p | June 25 |  | 94 % | Full | Yes | N |
| 103q | June 26 |  | 98 % | Full | Yes | N |
| 103r | June 27 | 88 F | 97 % | Partial | Yes | Y |
| 103s | June 28 | 81 F | 93 % |  | Yes | Y |
| 103t | June 29 | 77 F | 90 % | Full | Yes | N |
| 103u | June 30 | 95 F | 84 % | No | No | Y |
| 103v | July 1 | 97 F | 74 % |  | No | N |
| 103w | July 2 | 99 F | 69 % | No |  | N |
| 103x | July 3 | 100 F |  | No | No | N |
| 103y | July 4 | 101 F |  | No | No | N |
| 103z | July 5 | 98 F |  | No | No | N |

FIG. 1

DECISION TREE LEARNING WITH MISSING DATA

BACKGROUND

Decision trees can be used as a form of machine-learning to draw conclusions from a data set. Generally, several criteria applicable to all of the records in the data set can be evaluated for use as a split point, with the best-suited criterion being selected as a starting point for generating the decision tree. Missing or incomplete data may result in records being incorrectly sorted or not sorted at all. In such situations, missing or incomplete data may be imputed or inferred based on other records in the data set. For example, in a data set that tracks the daily temperature, a historic average temperature for a particular day could be used if a particular day's temperature were missing. While such an approach may improve the way individual records with missing data are evaluated, the approach does not truly represent the missing data.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 1 illustrates an example data set that could be used as training data for various embodiments of the present disclosure.

DETAILED DESCRIPTION

Figure 2:
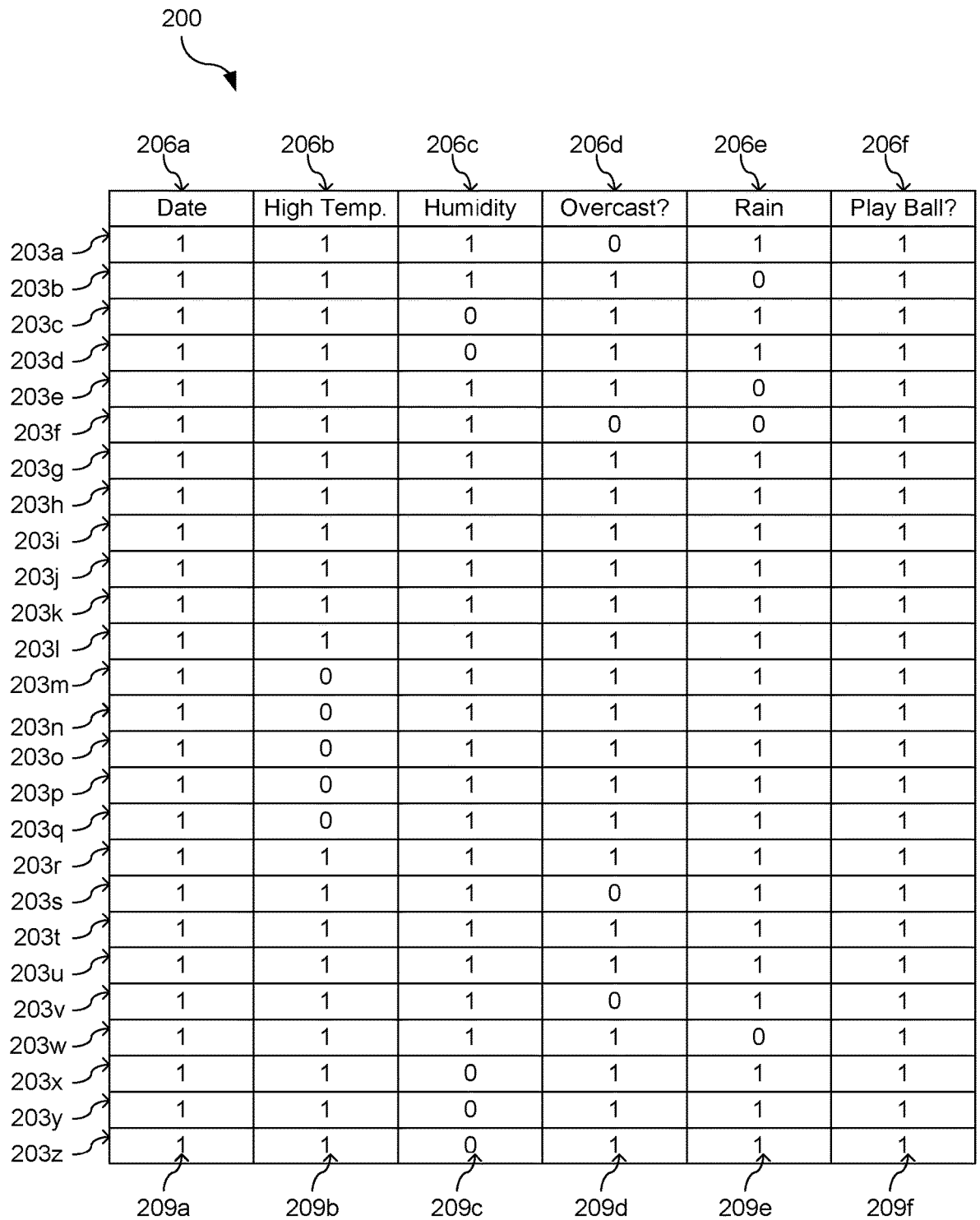
FIG. 2 illustrates a derivative data set based on the data set of FIG. 1 that can be used during the training process for various embodiments of the present disclosure.

Disclosed are various approaches for evaluating records with missing data when using a decision tree. In contrast to other approaches, which try to estimate or predict the value of missing data in order to allow for a decision tree to evaluate the record, the approaches herein account for missing data as an additional data point to be considered when evaluating how to split a data set into multiple subsets. As a result, the decision tree can more accurately evaluate records in a data set with missing or omitted data points. Accordingly, the decision tree can make more accurate predictions or inferences using incomplete data compared to previous approaches.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

FIG. 1 depicts an example data set 100 to be evaluated by a decision tree. The data set 100 can include one or more records 103a-103z (collectively, the records 103). Each record 103 can have one or more attributes 106a-106f (collectively, the attributes 106), which can have a respective value 109. While some records 103 may have a value 109 (e.g., values 109a, 109b, 109c, 109d, 109e, and 109f) for each attribute 106, other records 103 may be incomplete because one or more attributes 106 may lack a respective value 109. This could occur, for example, when the data collected is incomplete, as a result of a mistake during data entry or data collection, or as the result of various other circumstances.

The example data set 100 depicts weather data collected on a daily basis as it pertains to athletic events. Each illustrative example record 103 represents a single day, and the attributes 106 represent weather data collected for that day as well as weather an athletic event (denoted as "play ball") occurred. Although the example data set 100 depicts weather data as it relates to an athletic event, the principles of the various embodiments of the present disclosure would apply to any data set. For example, the principles of the various embodiments of the present disclosure could apply to data sets 100 containing customer or personal data (e.g., of financial account holders).

FIG. 2 depicts an example set 200 of binary encodings that are representative of the values 109 for the individual attributes 106 of individual records 103 in the data set 100. For each record 103, the set 200 of binary encodes includes a respective binary record 203. Each binary record 203 can include one or more binary attributes 206 with respective binary values 209 (e.g., binary values 209a, 209b, 209c, 209d, 209e, and 209f). Each binary value 209 can indicate whether a respective value 109 was recorded for a respective attribute 103 of a respective record 103. If a value 109 for an attribute 106 in a record 103 was recorded, then a binary value 209 for the respective binary attribute 206 in the respective binary record 203 can be set to the value "1" or a similar value. Likewise, if a respective value 109 is missing for a respective attribute 106 of a respective record 103, then the binary value 209 of the respective binary attribute 206 of the respective binary record 203 can be set to "0" or a similar value.

Figure 3:
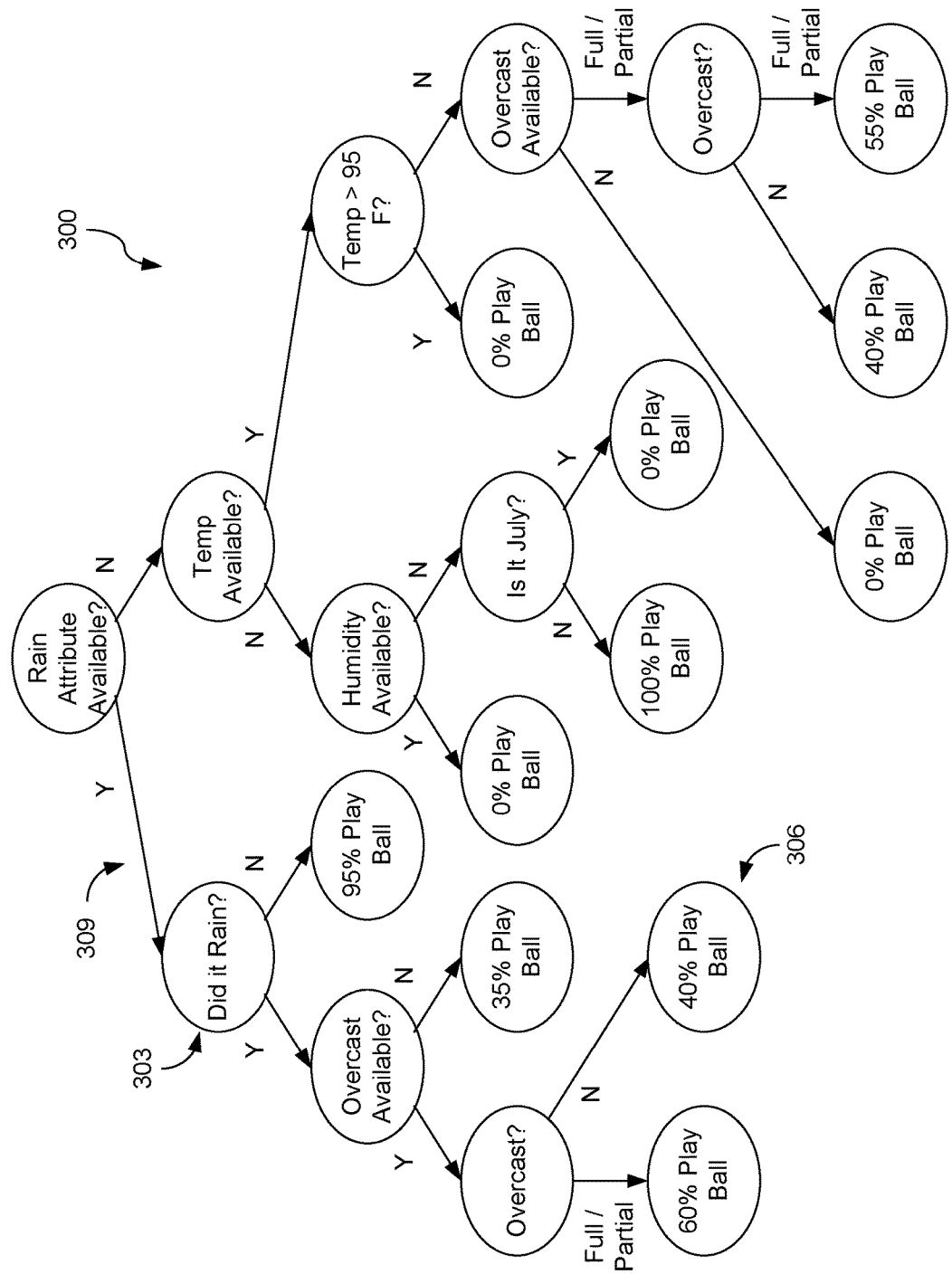
FIG. 3 illustrates an example of a decision tree generated from the example data depicted in FIGS. 1 and 2 according to various embodiments of the present disclosure.

FIG. 3 depicts an example of a decision tree 300 generated based at least in part on the data set 100 and the set 200 of binary encodings according to various embodiments of the present disclosure. The decision tree 300 can include one or more decision nodes 303, one or more leaf nodes 306, and one or more edges 309 between decision nodes 303 and/or leaf nodes 306. Each decision node 303 can represent a condition to be evaluated. For example, a decision node 303 could represent determining the value 109 for an attribute 106 of a record 103 in a data set 100. Each leaf node 306 can represent a classification, decision, or prediction inferred from the data set 100. To continue with the sports example, a leaf node 306 could represent the probability that an athletic event will occur based on the respective values 109 of various attributes 106 of individual records 103 in the data set 100. The edges 309 between individual decision nodes 303 or between a decision node 303 and a leaf node 306 represent the outcome of an evaluation represented by the decision node 303. For example, the decision node 303 representing the question "Did it rain" could include two edges 309—one representing that it did rain on a particular day and the other representing that it did not rain on a particular day. As another example, a decision node 303 could represent a decision regarding whether a particular attribute 106 in a data set has a respective value 109 that is available.

Figure 4:
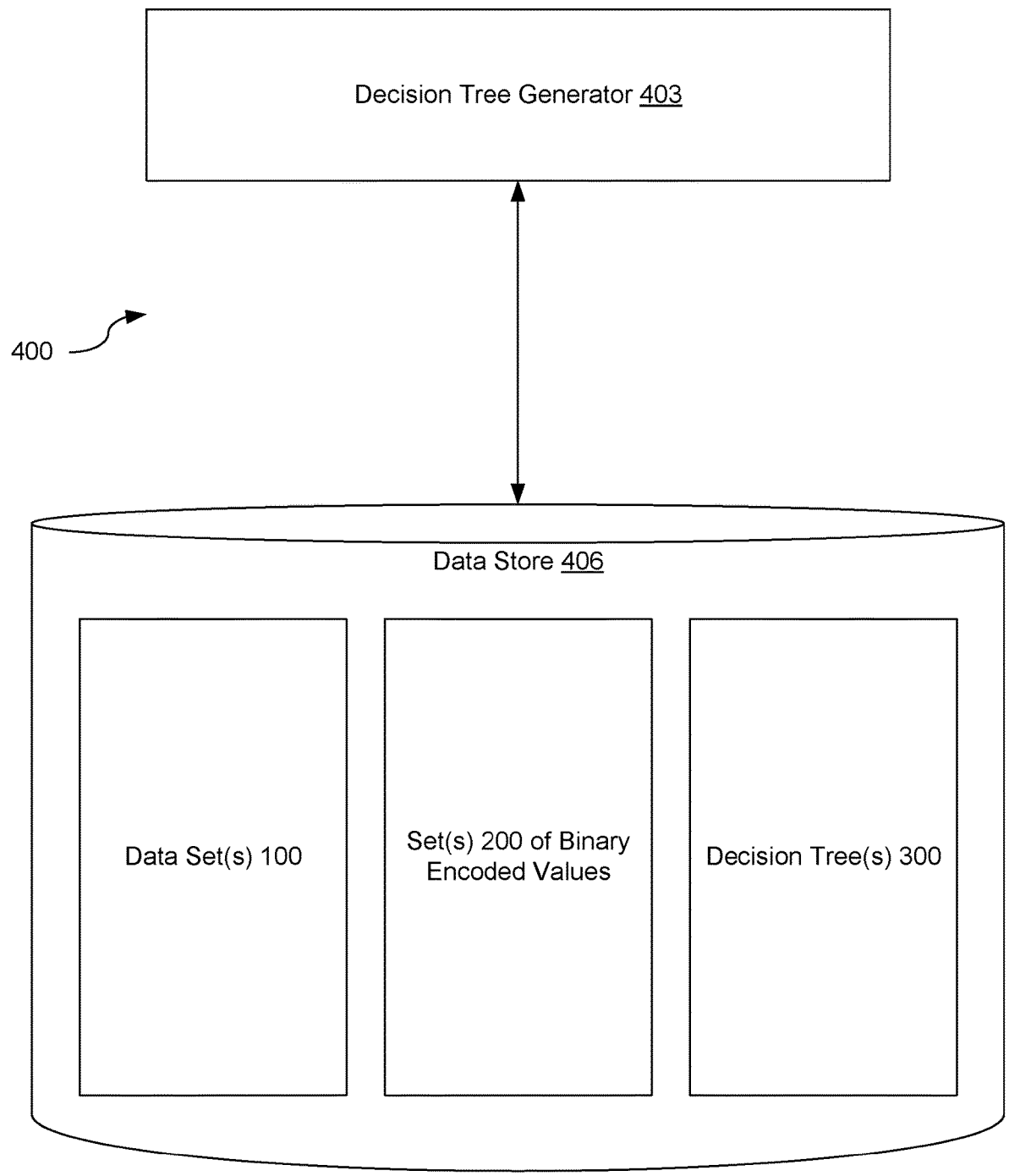
FIG. 4 illustrates an example of a computing environment used to implement the various embodiments of the present disclosure.

With reference to FIG. 4, shown is a computing environment 400 according to various embodiments of the present disclosure. The computing environment 400 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 400 can employ a plurality of computing devices that can be arranged in one or more server banks or computer banks or other arrangements. Such computing devices can be located in a single installation or can be distributed among many different geographical locations. For example, the computing environment 400 can include a plurality of computing devices that together can include a hosted computing resource, a grid computing resource or any other distributed computing arrangement. In some cases, the computing environment 400 can correspond to an elastic computing resource where the allotted capacity of processing, network, storage, or other computing-related resources can vary over time.

Various applications or other functionality can be executed in the computing environment 400. The components executed in the computing environment 400 can include a decision tree generator 403, and other applications, services, processes, systems, engines, or functionality not discussed in detail herein.

The decision tree generator 403 can be executed to evaluate a data set 100 for the purpose of generating a decision tree 300. Accordingly, the decision tree generator 403 could be configured to evaluate the individual records 103 in a data set 100 to create a corresponding set 200 of binary encoded values. The decision tree generator 403 could then evaluate the data set 100 and the set 200 of binary encoded values in order to generate a decision tree 300.

Also, various data is stored in a data store 406 that is accessible to the components of the computing environment 400, such as the decision tree generator 403. The data store 406 can be representative of a plurality of data stores 406, which can include relational databases or non-relational databases such as object-oriented databases, hierarchical databases, hash tables or similar key-value data stores, as well as other data storage applications or data structures. The data stored in the data store 406 is associated with the operation of the various applications or functional entities described below. This data can include one or more data sets 100, one or more respective sets 200 of binary encodings, one or more respective decision trees 300, and potentially other data.

Next, a general description of the operation of the various components of the computing environment 400 is provided. Although the following general description may use specific examples of data, it is understood that these illustrative examples serve only to explain the principles of the present disclosure. The same principles could be used with any type of data within a data set 100 for the purpose of creating a respective decision tree 300.

To continue with the weather and sports example illustrated in FIGS. 1-3, the decision tree generator 403 could be executed to determine the probability that an athletic event would occur based on various weather conditions. Accordingly, the decision tree generator 403 could evaluate records 103 in a data set 100 to build a decision tree 300 that could be used to make appropriate predictions based on weather conditions.

For instance, the decision tree generator 403 could analyze the records 103 to determine that the attribute 106e for "Rain" can predict that an athletic event occurred with 95% probability. Accordingly, the decision tree generator 403 could first split the data set 100 into two subsets. The first subset would contain all records 103 where a value 109 for "Rain" is present. The first subset could then be further subdivided into a first group where records 103 have a value 109 of "Yes" for "Rain" and a second group where records 103 have a value 109 of "No" for "Rain." The second subset would contain all records 103 where the value 109 for "Rain" is absent. Appropriate decision nodes 303, leaf nodes 306, and edges 309 could be added to a decision tree 300 to reflect these subsets of records 103.

The decision tree generator 403 could then further evaluate and divide the second subset of records 103. As simple, but illustrative example, the decision tree generator 403 could determine that the presence of a value 109 for the attribute 106b of "High Temp.," when available, provides the best predictor for determining whether or not to "Play Ball." Accordingly, the decision tree generator 403 could then subdivide the second subset of records 103 into additional subsets or groups of records 103 based on whether a value 109 is present for the "High Temp." attribute 106b. The decision tree generator 403 could then add additional decision nodes 303, leaf nodes 306, and edges 309 could then be added to the next level of the decision tree 300, as illustrated previously in FIG. 3. The decision tree generator 403 could then continue to build the decision tree 300 until a predefined depth has been reached or until every possible combination of attributes 106 has been accounted for, depending on the particular implementation.

As an alternative example, an organization may have a data set 100 containing records 103 that represent customer accounts. These records could include one or more attributes 106 such as the account type; the first, middle, and/or last name of the account owner; a unique customer identifier (e.g., a social security number, a driver's license number, a passport number, etc.); the work and/or home address of the account owner; one or more telephone numbers associated with the account owner; etc. In order to identify which customer accounts are owned by the same account owner, the organization could execute the decision tree generator 403 to analyze the account records 103 in the data set 100 to learn which attributes 106 or combinations of attributes 106 identify accounts owned by the same individual.

For instance, the decision tree generator 403 could analyze the records 103 to determine that the attribute 106 for a unique identifier (e.g., social security number, driver's license number, etc.) will predict that two accounts are owned by the same individual with 100% accuracy. Accordingly, the decision tree generator 403 could first split the data set 100 into two subsets. The first subset would contain all records 103 where a value 109 for the unique identifier is present. The first subset could then be further subdivided into groups where account records 103 have a unique identifier for the owner (e.g., social security number, driver's license number, etc.) in common. The second subset would contain all records 103 where the value 109 for the unique identifier is absent. Appropriate decision nodes 303, leaf nodes 306, and edges 309 could be added to a decision tree 300 to reflect these subsets of records 103.

The decision tree generator 403 could then further evaluate and divide the second subset of records 103. As simple, but illustrative example, the decision tree generator 403 could determine that when a value 109 for the unique identifier of the account owner is missing, that the combination of the attributes 106 for the name of the account owner and the cellular phone number of the account owner can be used to predict if two accounts are owned by the same person with nearly 100% accuracy. Accordingly, the decision tree generator 403 could then subdivide the second subset of records 103 into three further subsets—a first subset where each record 103 has a value 109 for both the name and mobile phone number attributes 106 of the account owner; a second subset where each record 103 lacks a value 109 for the name of the account owner; and a third subset where each record 103 lacks a value 109 for the mobile phone number of the account owner. The decision tree generator 403 could then add additional decision nodes 303, leaf nodes 306, and edges 309 could then be added to the next level of the decision tree 300. The decision tree generator 403 could then continue to build the decision tree 300 until a predefined depth has been reached or until every possible combination of attributes 106 has been accounted for, depending on the particular implementation.

Figure 5:
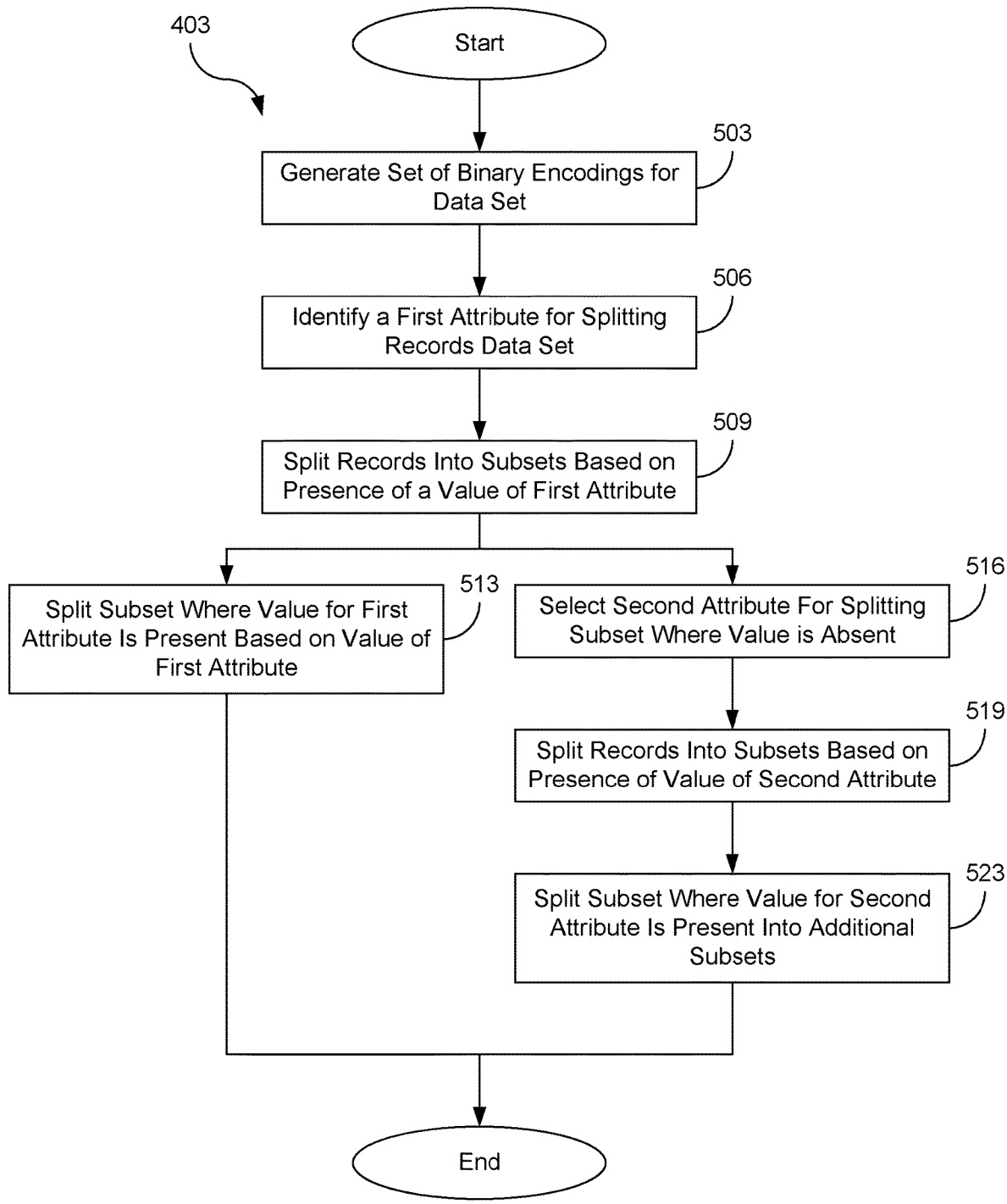
FIG. 5 illustrates a flowchart of an example implementation of the present disclosure.

Referring next to FIG. 5, shown is a flowchart that provides one example of the operation of a portion of the decision tree generator 403. The flowchart of FIG. 5 provides merely an example of the many different types of functional arrangements that can be employed to implement the operation of the depicted portion of the decision tree generator 403. As an alternative, the flowchart of FIG. 5 can be viewed as depicting an example of elements of a method implemented within the computing environment 400.

Beginning with block 503, the decision tree generator 403 can generate a set 200 of binary encodings for a respective data set 100. For example, for each record 103 in the data set 100, the decision tree generator 403 could create a respective binary record 203 in the set 200 of binary encodings. For each attribute 106 in the record 103, the decision tree generator 403 could determine whether a respective value 109 is present. If there is a value 109 present for the attribute 106, the decision tree generator 403 could set the binary value 209 of the binary attribute 206 of the respective binary record 203 to "1," "true," "Yes," or a similar Boolean value. If the value 109 is absent, then the decision tree generator 403 could set the binary value 209 to "0," "false," "No," or a similar Boolean value.

Then at block 506, the decision tree generator 403 can identify and select a first attribute 106 to use for splitting the records 103 in the data set 100 into two or more subsets of records 103. The first attribute 106 may be selected as the attribute 106 that is best-suited for minimizing the amount of entropy in the resulting subsets of records 103. Using the examples depicted in FIGS. 1-3, the attribute 106 representing whether or not it rained on a particular day could be used as an attribute 106 for splitting the records 103 into subsets. Likewise, an attribute 106 representing a unique identifier of individual customers (e.g., a social security number or similar unique identifier) could be identified and selected as the first attribute 106 to use for splitting records 103 into multiple subsets.

The first attribute 106 can be selected using a variety of approaches. For example, the decision tree generator 403 could calculate a Gini impurity for each attribute 106 in the data set 100. The first attribute 106 could then be selected from the available attributes 106 based on the Gini impurity associated with each of the attributes 106. As another example, the decision tree generator 403 could calculate an amount of information gain associated with each attribute 106 in the data set 100. The first attribute 106 could then be selected from the available attributes 106 based on the amount of information gain associated with each of the attributes 106. As a third example, the decision tree generator 403 could calculate a variance reduction for each attribute 106 in the data set 100. The first attribute 106 could then be selected from the available attributes 106 based on the variance reduction associated with each attribute 106 in the data set 100. In some implementations, a combination of these approaches could be used to select the first attribute 106.

Next at block 509, the decision tree generator 403 can perform a first split of the records 103 based on whether individual records 103 have a respective value 109 for the first attribute 106 selected previously at block 506. Additionally, the decision tree generator 403 can add a decision node 303 to a decision tree 300 to reflect this split as well as an edge 309 for each subset resulting from the split. For example, if processing records 103 representing weather data for individual days, the records 103 could be split into two subsets based on whether a value 109 for the attribute 106 representing whether it had rained on a that day were present or absent. Similarly, if processing records 103 representing bank account holders, the records 103 could be split into two subsets based on whether a value 109 for the attribute 106 representing a social security number or similar unique identifier were present or absent. A decision node 303 reflecting the evaluation could then be added to the decision tree 300.

The presence of the value 109 could be determined using any of several approaches. As a first approach, the decision tree generator 403 could query a respective binary record 203 and evaluate the binary value 209 of the respective binary attribute 206 for each record 103 in the data set 100. The decision tree generator 403 could then use the binary value 209 to determine whether a value 109 is present for the selected first attribute 106. In an alternative approach, the decision tree generator 403 can evaluate the record 103 to determine whether the selected first attribute 106 has a respective value 109 present. If a value 109 is present in the record 103 for the first attribute 106, then that record 103 may be placed into a first subset of records 103 representing those records 103 where a value 109 is present for the first attribute 106. If a value 109 for the first attribute 106 is absent from the record 103, then the record 103 can be placed into a second subset of records 103 representing those records 103 where the value 109 is absent for the first attribute 106.

Subsequently at block 513, the decision tree generator 403 can split the first subset of records 103 using the value 109 of the first attribute 106 selected at block 506. For example, if the first attribute 106 were represented whether or not it rained on a particular day, the decision tree generator 403 could split the first subset of records 103 into two subsets of records 103. The first subset of records 103 could contain all records 103 in the data set 100 where the "Rain" attribute 106 has a value 109 of "Yes" and the second subset of records 103 could contain all records 103 where the "Rain" attribute 106 has a value of "No." As a similar example, if the first subset of records 103 contained customer records 103 or customer account records 103 where unique customer identifier was present (e.g., a social security number), then the decision tree generator 403 could split the first subset of records 103 into multiple subsets, each of which has records 103 where the value 109 of the unique customer identifier is the same, such as where all customer records 103 have the same social security number. Additional decision nodes 303 or leaf nodes 306 could then be added to the decision tree 300 as appropriate and connected with respective edges 309 by the decision tree generator 403.

Meanwhile, in parallel with block 513, the decision tree generator 403 can, at block 516, select a second attribute 106 to use for splitting those records 103 which lack a value 109 for the attribute selected at block 506. The second attribute 106 for these records 103 can be selected using the same or similar approaches as previously discussed at block 506 to select the second attribute 106. This can include calculating a Gini impurity, information gain, or variance reduction for each attribute 106 that has not been previously selected as the basis for a split (e.g., the first attribute 106 selected at block 506). The decision tree generator 403 could then select the second attribute 106 based on the resulting Gini impurity, information gain, or variance reduction.

Then at block 519, the decision tree generator 403 can then split the records 103 based on whether there is a respective value 109 in each record 103 for the selected second attribute 106. The same or similar approaches as discussed in block 509 could be used to split the records 103 of the second subset into additional subsets of records 103. This could include evaluate the set 200 of binary encodings or processing individual records 103, as previously discussed for block 509. Once the records 103 are split, the decision tree generator 403 could generate additional decision nodes 303 or leaf nodes 306 and connect them to the decision tree 300 with additional edges 309 as appropriate.

Next at block 523, the decision tree generator 403 can split the subset of records where a value 109 is present for the selected second attribute 106 into additional subsets. This can be performed in the same or similar manner as previously described at block 513. Once the records 103 are split into additional subsets, the decision tree generator 403 could generate additional decision nodes 303 or leaf nodes 306 and connect them to the decision tree 300 with additional edges 309 as appropriate.

At this point, the process depicted in FIG. 5 could end. However, the process for the decision tree generator 403 depicted in the flowchart of FIG. 5 could be recursively or iteratively repeated. For example, the process depicted in FIG. 5 could be repeatedly performed by the decision tree generator 403 until all possible decision branches are generated. As another example, the process depicted in FIG. 5 could be repeated for subsequent levels in the decision tree 300 until a predefined depth in the decision tree 300 has been reached. At these points, the process described in FIG. 5 could reach a conclusive end.

Figure 6:
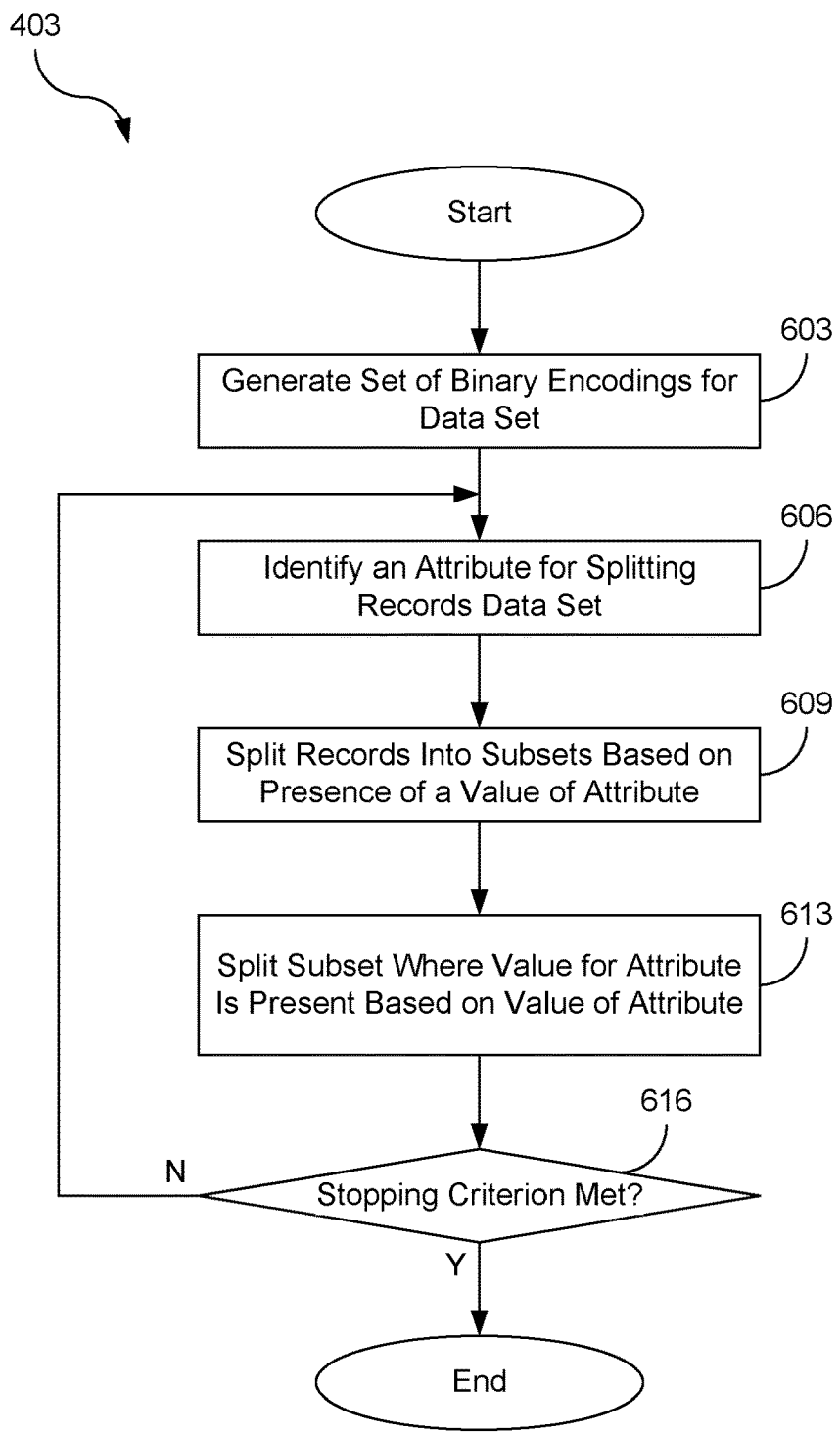
FIG. 6 illustrates a flowchart of an example implementation of the present disclosure.

FIG. 6 provides an example illustration of a recursive implementation of the process depicted in the flowchart of FIG. 5. In this illustrated example, the decision tree generator 403 may perform operations such as those depicted in boxes 603, 606, 609, and 613, which are the same as or similar to the corresponding operations described for the respective boxes 503, 506, 509, and 513 in FIG. 5. Then, at box 616, the decision tree generator 403 can determine whether a stopping criterion has been met. Various examples of stopping criterion can include the number of levels in the decision tree 300, the number of splits in the data set 100 used to build the decision tree 300, a predefined amount of Information Gain resulting from the splits of the data set 100, etc. However, any stopping criterion appropriate for a particular implementation can be used. If the stopping criterion has been met, then the decision tree generator 403 can cease building decision tree 300. If the stopping criterion has not yet been met, then the decision tree builder 403 can recursively continue to build the decision tree 300 by continuing operation at box 606 until the stopping criterion has been met.

The process depicted in FIG. 5 and FIG. 6 could also be described in pseudocode using three functions. The first function, referred to as "Encoding," can encode records 103 in the entire data set 100 into corresponding binary records 203. The second function, referred to as "Best_Split," can evaluate the best attribute 106 for splitting the records 103 in the data set 100 into multiple subsets using various criteria (e.g., Gini impurity, Information Gain, Variance Reduction, etc.). The third function, BuildTree, can build a decision tree 300 and introduce decision nodes 303 and leaf nodes 306, including decision nodes 303 that correspond to missing or available values 109 for attributes 106.

Encoding(D):
  For each attribute in D:
    For each data point:
      If missing:
        Set binary attribute:=1
      Else:
        Set binary attribute:=0
Best_Split(input data):
  For each attribute in input data:
    Evaluate best split using Information Gain, Gini or
      other criterion Identify best-suited split attribute $a_i$
  Return $a_i$
BuildTree(D):
  if stopping criterion met:
    Return Tree and stop
  Else:
    $a_i$:=Calculate Best_Split( )
    {S1, S2}=Split tree on Binary attribute corresponding
      to $a_i$
    For each set ∈{S1, S2}:
      Split on $a_i$
      For each split call BuildTree
    Return Tree A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device or in multiple computing devices.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   a computing device comprising a processor and a memory; and
   machine-readable instructions stored in the memory that, when executed by the processor, cause the computing device to at least:
      identify a first attribute to be a first unique identifier for splitting a plurality of records;

split the plurality of records into a first subset of records and a second subset of records, the first subset of records comprising each of the plurality of records where a value is present for the first attribute and the second subset of records comprising each of the plurality of records where the value is absent for the first attribute; and add a node to a decision tree that reflects the split of the plurality of records into the first subset of records and the second subset of records.

2. The system of claim 1, wherein the node is a first node and the machine-readable instructions, when executed, further cause the computing device to:

split the first subset of records into a third subset of records and a fourth subset of records based on the first attribute; and add a second node to a decision tree that reflects the split of the first subset of records into the third subset of records and the fourth subset of records.

3. The system of claim 1, wherein the machine-readable instructions, when executed, further cause the computing device to at least:

generate a set of binary encodings for each record in the plurality of records, each binary encoding in the set of binary encodings indicating whether a respective value is present for a respective attribute of each record; and determine whether a value is present for the first attribute for each record in the plurality of records based at least in part on the set of binary encodings.

4. The system of claim 2, wherein the machine-readable instructions, when executed by the processor, further cause the computing device to at least:

identify a second attribute to be a second unique identifier for splitting the second subset of records; and split the second subset of records into a fifth subset of records and a sixth subset of records, the fifth subset of records comprising individual ones of the plurality of records where the value is present for the second attribute and the sixth subset of records comprising individual ones of the plurality of records where the value is absent for the second attribute.

5. The system of claim 1, wherein the machine-readable instructions that cause the computing device to identify the first attribute for splitting the plurality of records further cause the computing device to at least:

calculate a Gini impurity for each attribute of a plurality of attributes associated with each of the plurality of records; and identify the first attribute based at least in part on the Gini impurity.

6. The system of claim 1, wherein the machine-readable instructions that cause the computing device to identify the first attribute for splitting the plurality of records further cause the computing device to at least:

calculate an amount of information gain for each attribute of a plurality of attributes associated with each of the plurality of records; and identify the first attribute based at least in part on the calculated amount of information gain.

7. The system of claim 1, wherein the machine-readable instructions that cause the computing device to identify the first attribute for splitting the plurality of records further cause the computing device to at least:

calculate a variance reduction for each attribute of a plurality of attributes associated with each of the plurality of records; and identify the first attribute based at least in part on the calculated variance reduction.

8. A computer-implemented method, comprising:

identifying a first attribute to be a first unique identifier for splitting a plurality of records;

splitting the plurality of records into a first subset of records and a second subset of records, the first subset of records comprising each of the plurality of records where a value is present for the first attribute and the second subset of records comprising each of the plurality of records where the value is absent for the first attribute; and adding a node to a decision tree that reflects the split of the plurality of records into the first subset of records and the second subset of records.

9. The computer-implemented method of claim 8, wherein the node is a first node and the method further comprises:

splitting the first subset of records into a third subset of records and a fourth subset of records based on the first attribute; and adding a second node to a decision tree that reflects the split of the first subset of records into the third subset of records and the fourth subset of records.

10. The computer-implemented method of claim 8, further comprising:

generating a set of binary encodings for each record in the plurality of records, each binary encoding in the set of binary encodings indicating whether a respective value is present for a respective attribute of each record; and determining whether a value is present for the first attribute for each record in the plurality of records based at least in part on the set of binary encodings.

11. The computer-implemented method of claim 9, further comprising:

identifying a second attribute to be a second unique identifier for splitting the second subset of records; and splitting the second subset of records into a fifth subset of records and a sixth subset of records, the fifth subset of records comprising individual ones of the plurality of records where the value is present for the second attribute and the sixth subset of records comprising individual ones of the plurality of records where the value is absent for the second attribute.

12. The computer-implemented method of claim 8, wherein identifying the first attribute for splitting the plurality of records further comprises:

calculating a Gini impurity for each attribute of a plurality of attributes associated with each of the plurality of records; and identifying the first attribute based at least in part on the Gini impurity.

13. The computer-implemented method of claim 8, wherein identifying the first attribute for splitting the plurality of records further comprises:

calculating an amount of information gain for each attribute of a plurality of attributes associated with each of the plurality of records; and identifying the first attribute based at least in part on the calculated amount of information gain.

14. The computer-implemented method of claim 8, wherein identifying the first attribute for splitting the plurality of records further comprises:

calculating a variance reduction for each attribute of a plurality of attributes associated with each of the plurality of records; and identifying the first attribute based at least in part on the calculated variance reduction.

15. A non-transitory, computer-readable medium, comprising machine-readable instructions stored in a memory that, when executed by a processor of a computing device, cause the computing device to at least:
- identify a first attribute to be a first unique identifier for splitting a plurality of records;
- split the plurality of records into a first subset of records and a second subset of records, the first subset of records comprising each of the plurality of records where a value is present for the first attribute and the second subset of records comprising each of the plurality of records where the value is absent for the first attribute; and
- add a node to a decision tree that reflects the split of the plurality of records into the first subset of records and the second subset of records.

16. The non-transitory, computer-readable medium of claim 15 wherein the machine-readable instructions, when executed, further cause the computing device to at least:
- generate a set of binary encodings for each record in the plurality of records, each binary encoding in the set of binary encodings indicating whether a respective value is present for a respective attribute of each record; and
- determine whether a value is present for the first attribute for each record in the plurality of records based at least in part on the set of binary encodings.

17. The non-transitory, computer-readable medium of claim 15, wherein the machine-readable instructions, when executed by the processor, further cause the computing device to at least:
- identify a second attribute to be a second unique identifier for splitting the second subset of records; and
- split the second subset of records into a third subset of records and a fourth subset of records, the third subset of records comprising individual ones of the plurality of records where the value is present for the second attribute and the fourth subset of records comprising individual ones of the plurality of records where the value is absent for the second attribute.

18. The non-transitory, computer-readable medium of claim 15, wherein the machine-readable instructions further cause the computing device to identify the first attribute for splitting the plurality of records further cause the computing device to at least:
- calculate an amount of information gain for each attribute of a plurality of attributes associated with each of the plurality of records; and
- identify the first attribute based at least in part on the calculated amount of information gain.

19. The non-transitory, computer-readable medium of claim 15, wherein the machine-readable instructions that cause the computing device to identify the first attribute for splitting the plurality of records further cause the computing device to at least:
- calculate a Gini impurity for each attribute of a plurality of attributes associated with each of the plurality of records; and
- identify the first attribute based at least in part on the Gini impurity.

20. The non-transitory, computer-readable medium of claim 15, wherein the machine-readable instructions that cause the computing device to identify the first attribute for splitting the plurality of records further cause the computing device to at least:
- calculate a variance reduction for each attribute of a plurality of attributes associated with each of the plurality of records; and
- identify the first attribute based at least in part on the calculated variance reduction.

* * * * *